United States Patent
Ahsbahs et al.

[11] Patent Number: 5,812,238
[45] Date of Patent: Sep. 22, 1998

[54] PROGRESSIVE MULTIFOCAL OPHTHALMIC LENS PAIR

[75] Inventors: Françoise Ahsbahs; Bernard Bourdoncle, both of Paris; Bénédicte Deldalle, Serevon; Christian Miege, Paris, all of France

[73] Assignee: Essilor International, Charenton LePont, France

[21] Appl. No.: 833,630

[22] Filed: Apr. 8, 1997

Related U.S. Application Data

[63] Continuation of Ser. No. 222,751, Apr. 4, 1994, abandoned.

[30] Foreign Application Priority Data

Apr. 23, 1993 [FR] France .................... 93 04837

[51] Int. Cl.$^6$ ................................ G02C 7/06
[52] U.S. Cl. ............................ 351/169; 351/168
[58] Field of Search .................. 351/169, 161, 351/168, 164, 160 R, 170–172

[56] References Cited

U.S. PATENT DOCUMENTS

| | | | |
|---|---|---|---|
| 3,910,691 | 10/1975 | Maitenaz | 351/169 |
| 4,640,593 | 2/1987 | Shinohara | 351/169 |
| 4,778,266 | 10/1988 | Maitenaz | 351/169 |
| 4,946,270 | 8/1990 | Guilino et al. | 351/169 |
| 5,123,725 | 6/1992 | Winthrop | 351/169 |
| 5,137,343 | 8/1992 | Kelch | 351/169 |
| 5,151,723 | 9/1992 | Tajiri | 351/161 |
| 5,483,304 | 1/1996 | Porat | 351/161 |
| 5,530,491 | 6/1996 | Baude et al. | 351/168 |

FOREIGN PATENT DOCUMENTS

| | | | |
|---|---|---|---|
| 0027339 A2 | 4/1981 | European Pat. Off. | |
| 0271920 A2 | 6/1988 | European Pat. Off. | |
| 0-384 128 A3 | 8/1990 | European Pat. Off. | G02C 7/02 |
| 0384128 A | 8/1990 | European Pat. Off. | |
| 0453136 | 10/1991 | European Pat. Off. | G02C 7/04 |
| WO 93/07525 | 10/1992 | Japan. | |
| 2 019 030 | 10/1979 | United Kingdom | G02C 7/06 |
| 2092772 | 8/1982 | United Kingdom. | |
| 2 206 978 | 1/1989 | United Kingdom | G02C 7/06 |
| WO-A-9109336 | 6/1991 | WIPO | G02C 7/04 |

Primary Examiner—Georgia Y. Epps
Assistant Examiner—Jordan M. Schwartz
Attorney, Agent, or Firm—Fish & Richardson P.C.

[57] ABSTRACT

In a pair of progressive multifocal ophthalmic lenses, in which each lens has an aspherical surface comprising a far vision portion, a near vision portion, an intermediate vision portion, and a prime meridian of power progression passing through these three portions, the prime meridians of progression of the lenses are substantially symmetrical with respect to each other, and one of the lenses is more particularly dedicated to far vision and the other is more particularly dedicated to near vision, the lens dedicated to far vision having a more extensive far vision portion than the far vision portion of the lens dedicated to near vision, and the lens dedicated to far vision having a less extensive near vision portion than the near vision portion of the lens dedicated to near vision.

22 Claims, 3 Drawing Sheets

PROGRESSIVE MULTIFOCAL OPHTHALMIC LENS PAIR

This is a continuation of application Ser. No. 08/222,751, filed Apr. 4, 1994, now abandoned.

BACKGROUND OF THE INVENTION

The present invention relates to a pair of progressive multifocal ophthalmic lenses, each of said lenses comprising an aspherical surface comprising a far vision portion, a near vision portion, an intermediate vision portion, and a prime meridian of progression passing through the said three portions.

Progressive multifocal ophthalmic lenses are now well known. They are used for correcting presbyopia and enable persons wearing spectacles to view objects over a wide range of distances, without having to remove their spectacles. Such lenses typically include a far vision portion situated in the upper part of the lens, a near vision portion situated in the lower part of the lens and an intermediate portion connecting the close and far vision zones.

Usually, these progressive multifocal lenses comprise an aspherical front surface directed away from the person wearing the spectacles and a rear toroidal or spherical-shaped surface directed towards the wearer of the spectacles. This toroidal or spherical-shaped surface allows the lens to be adapted to the user's ametropia and thus a progressive multifocal lens is only generally defined by its aspherical, or non-spherical front surface.

The spectacles of a person wearing progressive multifocal lenses are fitted with two lenses, which may be identical, in which case they are rotated through about 10° with respect to each other before they are fitted into the frame. The use of left-hand and right-hand lenses that are mutually symmetrical with respect to a vertical plane passing between the two lenses and perpendicular to the plane thereof has also been proposed.

In order to create progressive multifocal lenses, the starting point is generally the establishment of a line referred to as the prime meridian of power progression, which corresponds to the points at which the line along which the person wearing the spectacles looks for different distances in the sagittal plane intersects the surface of the lens. Next, the shape of the aspherical surface along this meridian and in the region thereof is defined. Where the prime meridian of power progression is the intersection of a plane and of the aspherical surface, in other words a straight line in projection from the lens onto a plane, identical lenses can be employed for the left eye and the right eye, by off-setting them by an angle of about 10° at the time of mounting. If the prime meridian of power progression is not a straight line, left and right lenses which are both symmetrical with respect to a median nasal plane are employed generally.

Multifocal ophthalmic lenses, regardless of their type, inevitably suffer from optical aberrations (astigmatism, field curvature, prismatic distortions, etc.) which interfere with visual comfort, both under static and dynamic viewing conditions.

Outside the region of the prime meridian of power progression and the stable visual fields in the far and near vision zones, vision with progressive multifocal lenses is not without problems due to the aspherical nature of the lenses and, in particular, as regards peripheral vision, due to the fact that the left and right lenses do not necessarily have identical horizontal and vertical curvatures or, at least, curvatures that are sufficiently near to avoid all discomfort to the user. It has been found that variation in horizontal curvature in fact cause very little visual discomfort and it was proposed to limit variations in vertical curvature to points on the lens having the same y-axis coordinate.

More precisely, the present Applicant proposed, in French patent publication No. 2,193,989, limiting variations in vertical curvature between a given point on the lens and the point on the prime meridian of progression having the same value on the y-axis, as a function of the power addition factor of the lens. This solution made it possible to reduce vertical prismatic deviations thus improving visual comfort of progressive lenses. Nevertheless, this solution did not enable a sufficiently large increase in far and near vision fields to be obtained.

SUMMARY OF THE INVENTION

The present invention sets out to a pair of progressive multifocal lenses which overcomes the disadvantages of lenses of the prior art, and provides an improvement in overall vision by a partial binocular summing of, on the one hand, the far vision fields and, on the other hand, the near vision fields of the two lenses.

The invention provides a pair of progressive multifocal ophthalmic lenses, each lens having an aspherical surface comprising a far vision portion, a near vision portion, an intermediate vision portion, a prime meridian of power progression passing through these three portions, wherein the prime meridians of progression of said lenses are substantially symmetrical with respect to each other, one of said lenses being more particularly dedicated to far vision and the other of said lenses being more particularly dedicated to near vision, said lens dedicated to far vision having a more extensive far vision portion than the far vision portion of said lens dedicated to near vision, and said lens dedicated to far vision having a less extensive near vision portion than the near vision portion of said lens dedicated to near vision.

Thus, the pair of progressive multifocal lenses according to the invention provides the wearer of spectacles with a wide effective field for binocular vision, both for far vision and for near vision, which is larger than that obtainable by prior art lenses having a prime meridian of progression identical to that of the lenses in the invention.

According to one preferred feature, the vertical prismatic deviations between corresponding points on said lens dedicated to near vision and said lens dedicated to far vision are less than 0.5 diopter prismatic deviation.

According to another preferred feature, the surface area of the far vision portion of the lens dedicated to far vision is at least twice as large as the far vision portion of the lens dedicated to near vision.

In one embodiment, the surface area of the near vision portion of the lens dedicated to near vision is at least twice the surface area of the near vision portion of the lens dedicated to far vision.

According to a preferred embodiment, the surface area of the near vision portion of the lens dedicated to near vision is about three times the surface area of the near vision portion of the lens dedicated to far vision.

According to another preferred embodiment, the ratio between the width of the near vision portion of the lens dedicated to near vision and the width of the near vision portion of the lens dedicated to far vision, measured horizontally at a position approximately 14 mm below the geometrical center of the lens, is greater than or equal to two to one.

Finally, it is possible for the width of the near vision portion, measured horizontally about 14 mm below the diametrical center of the lens, to be over 20 mm for the lens dedicated to near vision and to be some 9 mm for the near vision portion of the lens dedicated to far vision.

Other features and advantages of the present invention will become more clear from the description that follows of one embodiment of the invention provided by way of non-limiting example and with reference to the attached drawings.

DETAILED DESCRIPTION OF A PREFERRED EMBODIMENT

FIGS. 1 to 5 show the optical characteristics of various lenses, considering a lens diameter of around 60 mm.

Figure 1:
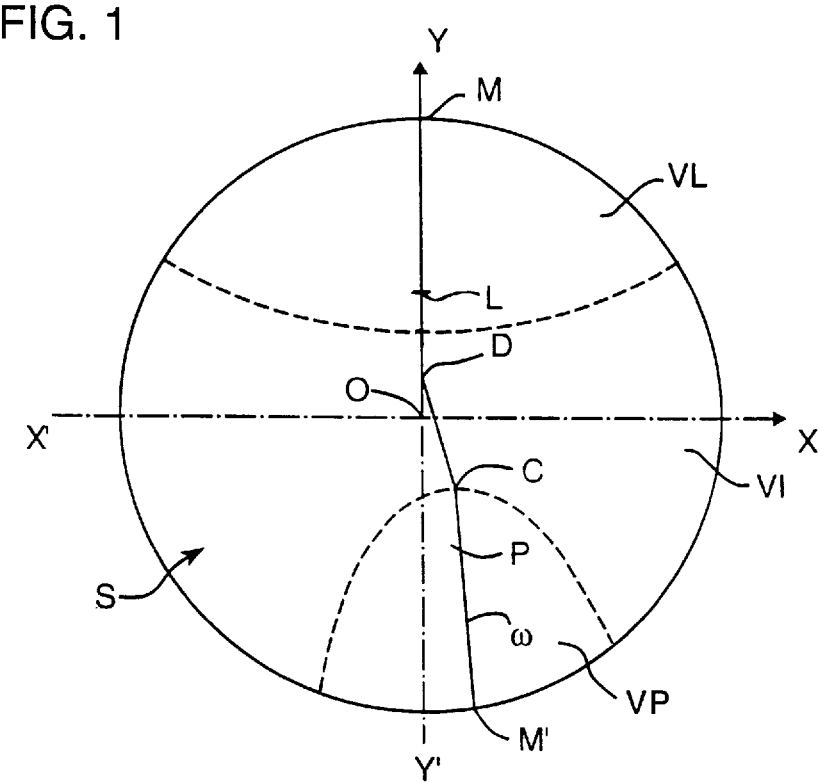
FIG. 1 is a diagrammatical front view of a progressive multifocal lens.

FIG. 1 is a front view of a progressive multifocal lens 1. Lens 1 has an aspherical face shown in FIG. 1, the other face being spherical or toroidal. The principal meridian of progression MM' of the lens is shown as a bold line in FIG. 1, L being the distance vision control point and P being the near vision control point.

Conventionally, lens 1 comprises a far or distance vision portion VL in its upper region and a near vision portion VP in its lower region, an intermediate zone VI existing between the two. In FIG. 1, the point O is the geometrical center of lens 1.

The principal meridian of progression MM' of the lens is essentially composed of three straight line segments, the first one extending substantially vertically from the top of the lens, passing through the point L, down to a point D, called the fitting center, and located between the distance vision control point L and the geometrical center O. The second segment extends from point D obliquely towards the nasal side of the lens, and the third segment starts from the end C of the second segment and passes through the near vision control point P. The relative angles of these segments advantageously varies as a function of the power addition value A.

As has been seen, for every point on the aspherical surface, a mean sphere or power D is defined from the formula:

$$D = \frac{n-1}{2} \left( \frac{1}{R_1} + \frac{1}{R_2} \right)$$

in which:

$R_1$ and $R_2$ are the maximum and minimum radii of curvature expressed in meters, and n is the refractive index of the lens material.

An astigmatism or cylinder C is also defined by means of the formula:

$$C = (n-1) \left| \frac{1}{R_1} - \frac{1}{R_2} \right|$$

In prior art lenses, and in particular those provided by the applicant, vision in the region around the principal meridian of progression is completely satisfactory. In order to improve overall vision, notably in the peripheral portions of the lens, the present invention proposes using left-hand and right-hand lenses which are neither identical nor symmetrical. More precisely, the invention sets out to increase the usable viewing field by a partial additive effect of, firstly, the far vision fields and, secondly, the near vision fields of the two lenses.

The usable viewing field is the binocular vision field for which, firstly, correct image merging and, secondly, satisfactory visual acuity is available to the wearer of this spectacles.

FIGS. 2 to 5 show views of a pair of lenses according to the invention having, by way of example, a power addition factor of 2 diopters.

Figure 2:
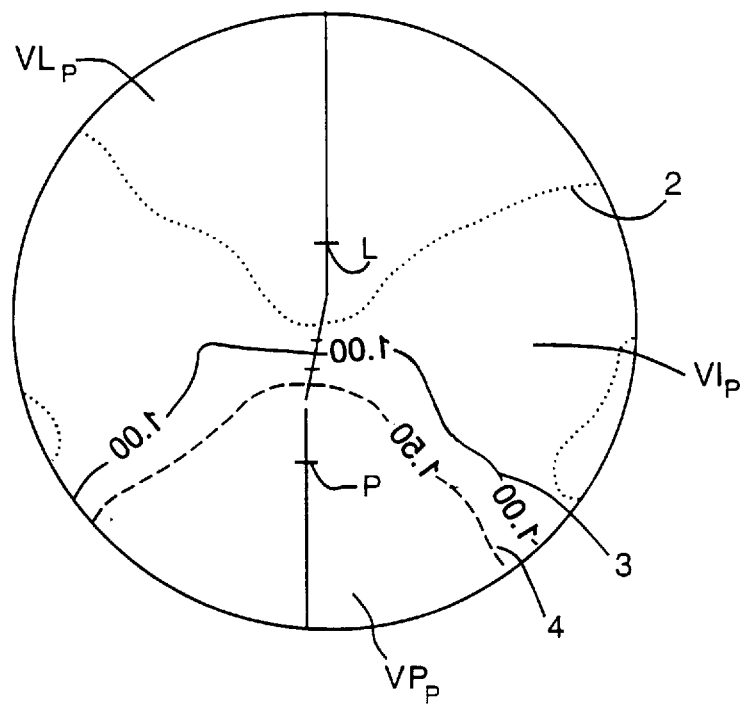
FIG. 2 is a front view of a left-hand lens according to the invention, showing the prime meridian of progression and lines joining points of identical mean power.

FIG. 2 is a front view of a left-hand lens according to the invention showing the prime meridian of progression and mean power level lines. FIG. 2 in fact reproduces the known elements shown in FIG. 1, with the addition of the said mean power level lines. The latter will be referred to herein as isopower (or isosphere) lines as they are lines joining points on the surface for which the mean power (or sphere) of the lens has the same value. The isopower lines in FIG. 2 are lines for which the mean power is higher by 0.5, 1, or 1.5 diopters than that of the distance vision control point L. Isopower line 2 joining points having a power 0.5 diopters higher than point L substantially constitutes the boundary between the far vision portion $VL_P$ and the intermediate vision portion $VI_P$. Line 3 is a mean power line that is 1 diopter higher than the mean power value of point L. The line identified by reference 4 joining points having a mean power 1.5 diopters higher than point L can be more or less considered as being the boundary between the intermediate vision portion $VI_P$ and the near vision portion $VP_P$.

Figure 3:
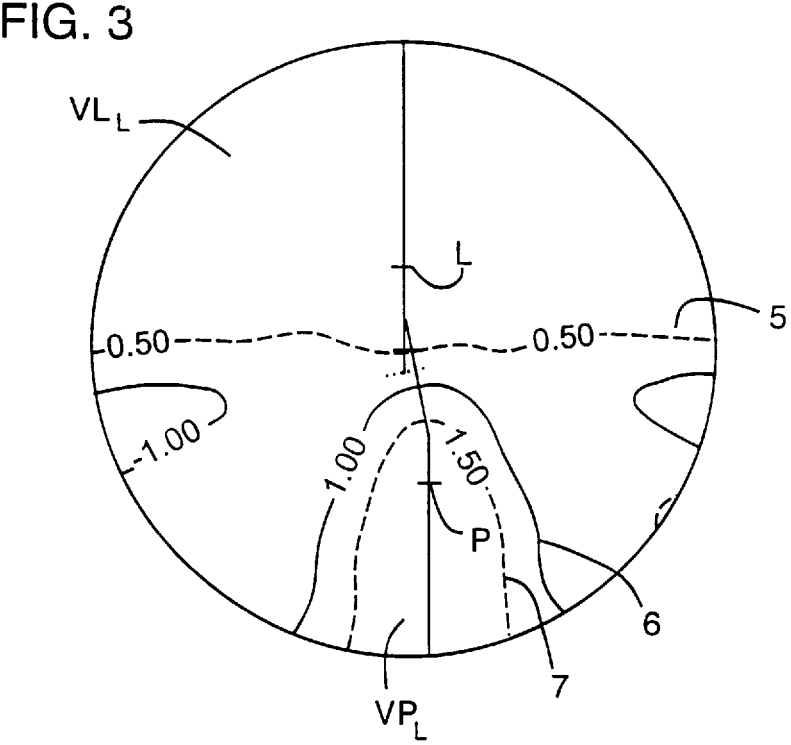
FIG. 3 is front view of a right-hand lens according to the invention, showing the prime meridian of progression and lines joining points of identical mean power.

FIG. 3 is a front view of a right-hand lens according to the invention showing the prime meridian of progression and mean power level lines. The known elements shown in FIG. 1 are repeated in FIG. 3, like they were in FIG. 2. FIG. 3 also includes the isosphere (or isopower) lines for which the mean power is higher by 0.5, 1, or 1.5 diopters than that of the distance vision control point L, like in FIG. 2. They are identified by numerical references 5, 6 and 7 respectively.

Like in the case of certain prior art lenses, the prime meridians of power progression of the left and right hand lenses shown in FIGS. 2 and 3 are symmetrical with respect to each other. This provides the wearer of the lenses with enhanced visual comfort.

According to the invention, the progressive multifocal lens wearer's comfort is improved if, as shown in FIGS. 2 and 3, the left and right lenses have different aspherical surfaces outside of the region surrounding the prime meridian of power progression. The isopower lines 2, 3 and 4 of the left-hand lens are effectively not symmetrical with respective iso-power lines 5, 6, 7 of the right hand lens.

On the left-hand lens in FIG. 2, the 1.5 diopter isopower line 4, which substantially defines the boundary of the near vision portion $VP_P$ of the left-hand lens surrounds an area which is much more extensive than that for the 1.5 diopter isopower line 7 of the right-hand lens in FIG. 3, the latter substantially defining the limit of the near vision portion $VP_L$ of the right-hand lens. More precisely, if the width of the near vision portion is measured, horizontally to both sides of the point P having a y-coordinate of −14 mm with respect to the geometrical center O of the lens, up to the line 4 or 7 representing the 1.5 diopter isopower line, it is found that, in the lens shown:

for the left-hand lens, the width is 24 mm, and for the right-hand lens, the width is 11 mm.

If, on the other hand, the 0.5 isopower line 2 which substantially defines the boundary of far vision portion $VL_P$ of the left-hand lens in FIG. 2 is compared with the corresponding line in FIG. 3, it will be seen that it surrounds a region which is much less extensive than that defined by the 0.5 isopower line 5, the latter substantially defining the boundary of the far vision portion $VL_L$ of the right-hand lens in FIG. 3. More precisely, isopower line 2 of the left-hand lens in FIG. 2 is substantially made up by two straight line segments passing through the geometrical center O of the lens and making an angle of about 30° to 40° with the horizontal. Thus, the far vision portion $VL_P$ of the left-hand lens in FIG. 2 is made up by an angular sector of 110°. On the right-hand lens shown in FIG. 3, the 0.5 isopower line 5 substantially coincides with a horizontal diameter of the lens, the far vision portion $VL_L$ essentially consisting of the upper half of the lens.

Thus, according to the invention, the left-hand lens has an extended near vision portion $VP_P$ and a reduced far vision portion $VL_P$ whereas the right-hand lens has a reduced near vision portion $VP_L$ and an extended far vision portion $VL_L$. The two lenses are symmetrical in the region of the prime meridian of progression. The overall vision of the person wearing the spectacles is improved due to the increase in the usable visual field. The effect of summing fields $VP_P$ and $VP_L$ for near viewing work, combined with the effect of summing fields $VL_P$ and $VL_L$ for far vision, provides the wearer of the spectacles with a usable viewing field which is more extensive than that obtainable with two identical lenses according to the prior art.

In order to allow the images to merge, even in the peripheral parts of the far and near vision portions, the invention provides for the differences in vertical prismatic deviations between corresponding points on the left and right lenses (in other words between the points on the left and right lenses used to view an object) to have, at most, a value of 0.5 diopters prismatic distortion. Thus, vision in the peripheral parts of the far and near vision portions remains binocular, and satisfactory merging of the two images is always obtained.

The invention thus proposes dedicating each lens in the pair of progressive multifocal lenses to near or far vision. We have described, with reference to FIGS. 2 and 3, the case where it is the left-hand lens that is dedicated to near vision and the right-hand lens that is dedicated to far vision. Obviously, this choice of left and right lenses could be reversed. This could simply be achieved by reversing the two lenses and ensuring vertical axial symmetry is maintained. The actual choice of whether to dedicate the lenses to far or near vision is specific to each wearer and depends on occular dominance or which of his eyes is the dominant one. In the present application, the far vision portion is identified by the reference VL with VP identifying the near vision portion, the lens that is dedicated to near vision being identified by the subscript "P", the subscript "L" identifying the lens dedicated to far vision.

Figure 4:
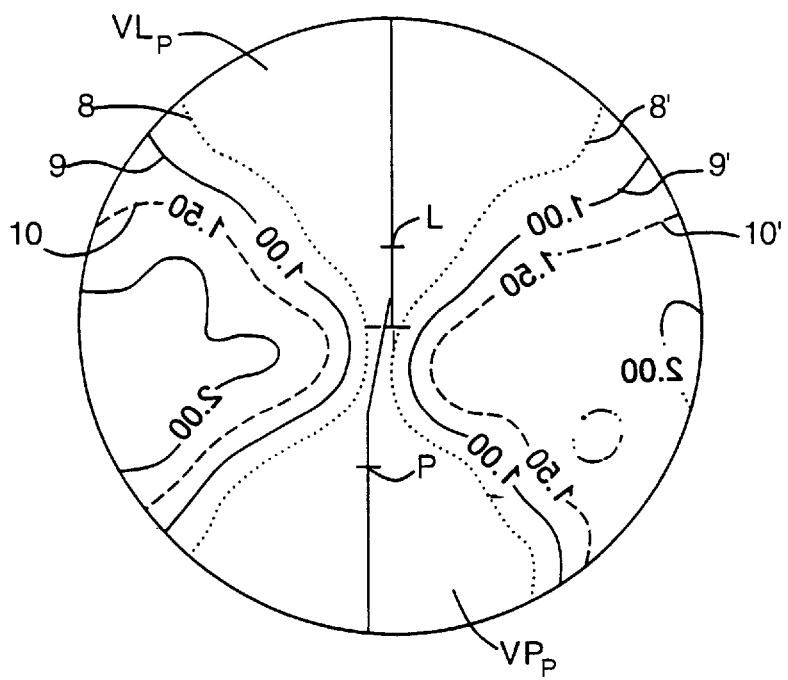
FIG. 4 is a view of the left-hand lens of FIG. 2, but showing lines of identical astigmatism or cylinder.

FIG. 4 shows the left-hand lens of FIG. 2 but showing this time lines of identical astigmatism or cylinder. The known elements from FIG. 1 have been incorporated, like in FIGS. 2 and 3. According to a similar principle to that explained for the isopower lines, FIG. 4 shows the iso-astigmatism lines for the left-hand lens with lines 8 and 8', 9 and 9', 10 and 10' representing respectively the 0.5, 1, and 1.5 diopter iso-astigmatism lines.

Figure 5:
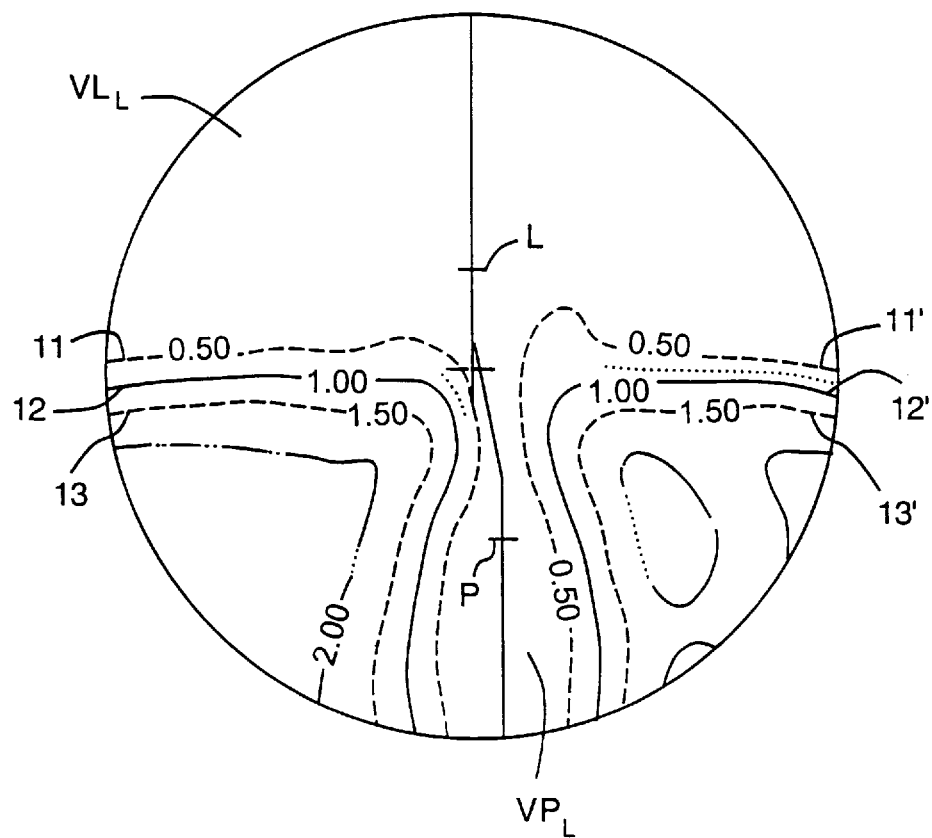
FIG. 5 is a view of the left-hand lens of FIG. 3, but showing lines of identical astigmatism.

FIG. 5 shows the right-hand lens in FIG. 3, but showing lines of identical astigmatism or cylinder; lines 11 and 11', 12 and 12', 13 and 13' are respectively the 0.5, 1, and 1.5 diopter iso-astigmatism lines respectively.

On FIG. 4, the 0.5 diopter iso-astigmatism lines which substantially correspond to the limits of far vision and near vision portions $VL_P$ and $VP_P$ respectively, substantially coincide with the bisecting lines of the lens. In this way, the far vision portion $VL_P$ of the left-hand lens the limits of which are defined by the 0.5 diopter iso-power line 2 in FIG. 2 (to which the 0.5 iso-astigmatism lines 8, 8' in FIG. 4 substantially correspond) is made up by an angular sector of 90°. The boundaries of the near vision portion $VP_P$ are represented by the 1.5 diopter iso-power line 4 of FIG. 2, to which the 0.5 diopter iso-astigmatism lines 8, 8' of FIG. 4 substantially correspond in the near vision portion. The width of the near vision portion $VP_P$, horizontally to both sides of y-axis point P situated at −14 mm from the geometrical center O of the lens up to the 1.5 diopter iso-power line 4 of FIG. 2, or up to the 0.5 diopter iso-astigmatism lines 8, 8' of FIG. 4 is over 20 mm. Regarding surface area, the near vision portion $VP_P$ is constituted, on the left-hand lens dedicated to near vision, by an angular sector of about 90°.

On FIG. 5, far vision portion $VL_L$ the boundaries of which substantially correspond to the 0.5 diopter iso-astigmatism lines 11, 11', substantially covers the upper half of the lens like in FIG. 3. The width of near vision portion $VP_L$, measured horizontally at the level of point P and extending up to the 0.5 diopter iso-astigmatism lines 11, 11' is 9 mm. The near vision portion $VP_L$ formed on the right-hand lens dedicated to far vision extends over an angular sector of about 20°.

Thus, in the pair of lenses according to the invention, the far vision portion $VL_L$ of the lens dedicated to far vision (FIGS. 3 and 5) is more or less twice as extensive as the far vision portion $VL_P$ of the lens dedicated to near vision (FIGS. 2 and 4). As opposed to this, the width of the near vision portion $VP_P$ of the lens dedicated to near vision (FIGS. 2 and 4) is more than twice that of the near vision portion $VP_L$ of the lens dedicated to far vision (FIGS. 3 and 5). The surface area of the near vision portion $VP_P$ of the lens dedicated to near vision is around about three times the size of the near vision portion $VP_L$ of the lens dedicated to far vision.

The invention thus provides wider visual fields on both sides of the prime meridian of power progression thereby ensuring good dynamic and peripheral vision, with the slight disturbances introduced by the lens dissymmetry being substantially outweighed by the benefits introduced through enlargement of the visual field.

One example of an embodiment of the invention for a pair of progressive multifocal lenses having a power addition of 2 diopters has been described in FIGS. 2 to 5. It is obvious that the invention applies to other power addition values, and that families of pairs of lenses according to the invention can be constituted. The values for the ratios between the surface areas of the far vision portions $VL_L$ and $VL_P$ of the lenses, and between the surface areas or widths of the near vision portions $VP_L$ and $VP_P$ may of course vary as a function of power addition.

Obviously, the present invention is not limited to the embodiments that had been described and shown, but may be subject to numerous variations available to those skilled in the art without however departing from the scope of the invention as defined herein.

What is claimed is:

1. A pair of progressive multifocal ophthalmic lenses adapted for eyeglasses, each lens having an aspherical surface comprising an upper far vision portion, a lower near vision portion, and, between said far vision portion and near vision portion, an intermediate vision portion, a prime meridian of power progression passing through these three portions, the prime meridians of progression of said lenses being substantially symmetrical with respect to each other, one of said lenses being more particularly dedicated to far vision and the other of said lenses being more particularly dedicated to near vision, said lens dedicated to far vision having a more extensive far vision portion than the far vision portion of said lens dedicated to near vision, and said lens dedicated to far vision having a less extensive near vision portion than the near vision portion of said lens dedicated to near vision.

2. A pair of lenses according to claim 1, wherein the vertical prismatic deviations on the prime meridian of power between corresponding points on said lens dedicated to near vision and said lens dedicated to far vision are less than 0.5 diopter prismatic deviation.

3. A pair of lenses according to claim 1, wherein the surface area of the far vision portion of the lens dedicated to far vision is at least twice as large as the surface area of the far vision portion of the lens dedicated to near vision.

4. A pair of lenses according to claim 1, wherein the surface area of the near vision portion of the lens dedicated to near vision is at least twice as large as the surface area of the near vision portion of the lens dedicated to far vision.

5. A pair of lenses according to claim 4, wherein the surface area of the near vision portion of the lens dedicated to near vision is about three times as large as the surface area of the near vision portion of the lens dedicated to far vision.

6. A pair of lenses according to claim 1, wherein the ratio between the width of the near vision portion of the lens dedicated to near vision and the width of the near vision portion of the lens dedicated to far vision, measured horizontally at a position approximately 14 mm below the geometrical center of the lens, is greater than or equal to two to one.

7. A pair of lenses according to one of claims 1 to 6, wherein the width of the near vision portion of the lens dedicated to near vision, measured horizontally at about 14 mm below the geometrical center of the lens is over 20 mm, and wherein the width of the near vision portion of the lens dedicated to far vision, measured horizontally at about 14 mm below the geometrical center of the lens is approximately 9 mm.

8. A pair of progressive multifocal ophthalmic lenses adapted for eyeglasses, each lens having an aspherical surface comprising a far vision portion, a near vision portion, an intermediate vision portion, a prime meridian of power progression passing through these three portions, the prime meridians of progression of said lenses being substantially symmetrical with respect to each other, one of said lenses being more particularly dedicated to far vision and the other of said lenses being more particularly dedicated to near vision, said lens dedicated to far vision having a more extensive far vision portion than the far vision portion of said lens dedicated to near vision, said lens dedicated to far vision having a less extensive near vision portion than the near vision portion of said lens dedicated to near vision, and the vertical prismatic deviations on the prime meridian of power between corresponding points on said lens dedicated to near vision and said lens dedicated to far vision being less than 0.5 diopter prismatic deviation.

9. A pair of lenses according to claim 8, wherein the surface area of the far vision portion of the lens dedicated to far vision is at least twice as large as the surface area of the far vision portion of the lens dedicated to near vision.

10. A pair of lenses according to claim 8, wherein the surface area of the near vision portion of the lens dedicated to near vision is at least twice as large as the surface area of the near vision portion of the lens dedicated to far vision.

11. A pair of lenses according to claim 10, wherein the surface area of the near vision portion of the lens dedicated to near vision is about three times as large as the surface area of the near vision portion of the lens dedicated to far vision.

12. A pair of lenses according to claim 8, wherein the ratio between the width of the near vision portion of the lens dedicated to near vision and the width of the near vision portion of the lens dedicated to far vision, measured horizontally at a position approximately 14 mm below the geometrical center of the lens, is greater than or equal to two to one.

13. A pair of lenses according to one of claims 8 to 12, wherein the width of the near vision portion of the lens dedicated to near vision, measured horizontally at about 14 mm below the geometrical center of the lens is over 20 mm, and wherein the width of the near vision portion of the lens dedicated to far vision, measured horizontally at about 14 mm below the geometrical center of the lens, is approximately 9 mm.

14. A pair of progressive multifocal ophthalmic lenses adapted for eyeglasses, each lens having an aspherical surface comprising a far vision portion, a near vision portion, an intermediate vision portion, a prime meridian of power progression passing through these three portions, the prime meridians of progression of said lenses being substantially symmetrical with respect to each other, one of said lenses being more particularly dedicated to far vision and the other of said lenses being more particularly dedicated to near vision, said lens dedicated to far vision having a far vision portion at least twice as large in surface area as the far vision portion of said lens dedicated to near vision, said lens dedicated to far vision having a less extensive near vision portion than the near vision portion of said lens dedicated to near vision, the vertical prismatic deviations on the prime meridian of power between corresponding points on said lens dedicated to near vision and said lens dedicated to far vision being less than 0.5 diopter prismatic deviation.

15. A pair of lenses according to claim 14, wherein the surface area of the near vision portion of the lens dedicated to near vision is at least twice as large as the surface area of the near vision portion of the lens dedicated to far vision.

16. A pair of lenses according to claim 15, wherein the surface area of the near vision portion of the lens dedicated to near vision is about three times as large as the surface area of the near vision portion of the lens dedicated to far vision.

17. A pair of lenses according to claim 14, wherein the ratio between the width of the near vision portion of the lens dedicated to near vision and the width of the near vision portion of the lens dedicated to far vision, measured horizontally at a position approximately 14 mm below the geometrical center of the lens, is greater than or equal to two to one.

18. A pair of lenses according to one of claims 14 to 17, wherein the width of the near vision portion of the lens dedicated to near vision, measured horizontally at about 14 mm below the geometrical center of the lens is over 20 mm, and wherein the width of the near vision portion of the lens dedicated to far vision, measured horizontally at about 14 mm below the geometrical center of the lens, is approximately 9 mm.

19. A pair of progressive multifocal ophthalmic lenses adapted for eyeglasses, each lens having an aspherical surface comprising a far vision portion, a near vision portion, an intermediate vision portion, a prime meridian of power progression passing through these three portions, the prime meridians of progression of said lenses being substantially symmetrical with respect to each other, one of said lenses being more particularly dedicated to far vision and the other of said lenses being more particularly dedicated to near vision, said lens dedicated to far vision having a far vision portion at least twice as large in surface area as the far vision portion of said lens dedicated to near vision, said lens dedicated to near vision having a near vision portion at least twice as large in surface area as the near vision portion of said lens dedicated to far vision, the vertical prismatic deviations on the prime meridian of power between corresponding points on said lens dedicated to near vision and said lens dedicated to far vision being less than 0.5 diopter prismatic deviation.

20. A pair of lenses according to claim 19, wherein the surface area of the near vision portion of the lens dedicated to near vision is about three times as large as the surface area of the near vision portion of the lens dedicated to far vision.

21. A pair of lenses according to claim 19, wherein the ratio between the width of the near vision portion of the lens dedicated to near vision and the width of the near vision portion of the lens dedicated to far vision, measured horizontally at a position approximately 14 mm below the geometrical center of the lens, is greater than or equal to two to one.

22. A pair of lenses according to one of claims 19 to 21, wherein the width of the near vision portion of the lens dedicated to near vision, measured horizontally at about 14 mm below the geometrical center of the lens is over 20 mm, and wherein the width of the near vision portion of the lens dedicated to far vision, measured horizontally at about 14 mm below the geometrical center of the lens, is approximately 9 mm.

* * * * *